United States Patent
Nyström et al.

(10) Patent No.: US 6,526,091 B1
(45) Date of Patent: Feb. 25, 2003

(54) COMMUNICATION METHODS AND APPARATUS BASED ON ORTHOGONAL HADAMARD-BASED SEQUENCES HAVING SELECTED CORRELATION PROPERTIES

(75) Inventors: Johan Nyström, Stockholm (SE); Branislav Popovic, Solna (SE)

(73) Assignee: Telefonaktiebolaget LM Ericsson, Stockholm (SE)

(*) Notice: Subject to any disclaimer, the term of this patent is extended or adjusted under 35 U.S.C. 154(b) by 0 days.

(21) Appl. No.: 09/135,247

(22) Filed: Aug. 17, 1998

(51) Int. Cl.[7] .................................. H04J 13/04
(52) U.S. Cl. ..................... 375/142; 375/145; 375/149; 375/150; 370/209
(58) Field of Search ................................ 375/140, 141, 375/142, 146, 147, 150, 145, 149; 370/208–210, 342

(56) References Cited

U.S. PATENT DOCUMENTS

| | | | |
|---|---|---|---|
| 5,353,332 A | 10/1994 | Raith et al. | |
| 5,353,352 A | 10/1994 | Dent et al. | |
| 5,357,454 A | 10/1994 | Dent | |
| 5,550,809 A | 8/1996 | Bottomley et al. | |
| 5,631,929 A | 5/1997 | Jones et al. | |
| 5,768,307 A | 6/1998 | Schramm et al. | |
| 6,091,761 A * | 7/2000 | Popovic | 375/142 |
| 6,215,762 B1 * | 4/2001 | Dent | 370/208 |

FOREIGN PATENT DOCUMENTS

| | | |
|---|---|---|
| EP | 814 581 | 12/1997 |
| EP | 878 930 | 11/1998 |
| WO | 97/15985 | 5/1997 |
| WO | 98/20639 | 5/1998 |
| WO | 98/37703 | 8/1998 |

OTHER PUBLICATIONS

International Search Report PCT/SE99/01331, Jan. 25, 2000.*
Budisin, S.Z., "New Complementary Pairs of Sequences", Electronics Letters, vol. 26, No. 13, pp. 881–883, Jun. 21, 1990.
Fong et al., "Concatenated Orthogonal/PN Spreading Scheme For Cellular DS–CDMA Systems with Integrated Traffic", Communications–Gateway to Globalization, Proceedings of the IEEE Conference on Communications, pp. 905–909, Jun. 18–22 1995.
"Ultra Physical Layer Description", Tdoc SMG2 UMTS–L1 221/98, vol. 0.4, ETSI Jun. 25, 1998.
"Evaluation Document (3.0) part 1: System Description Performance Evaluation", Tdoc SMG2 359/97, ETSI Wideband DS–CDMA concept group (Alpha), Dec. 1–5, 1997.
Budisin, S.Z., "New Multilevel Complementary Pairs of Sequences", Electronics Letters, vol. 26, No. 22, pp. 1861–1863, Oct. 25, 1990.
"An Orthogonal Set of Codes fir SCH Signalling with Good Correlation Properties and a Low Complexity Detector", ETSI (Jul. 15, 1998).
Abstract of WO 98/20639.

* cited by examiner

Primary Examiner—Amanda T. Le

(57) ABSTRACT

Methods and apparatus for synchronization of a transmitter and a receiver are based on orthogonal sequences having optimized correlation properties. The transmitter may generate signed versions of S-Hadamard sequences that are obtained by position-wise scrambling a set of Walsh-Hadamard sequences with a special sequence having complex elements of constant magnitude. The receiver estimates a time location and sequence identity of a received version of the synchronization signal.

44 Claims, 8 Drawing Sheets

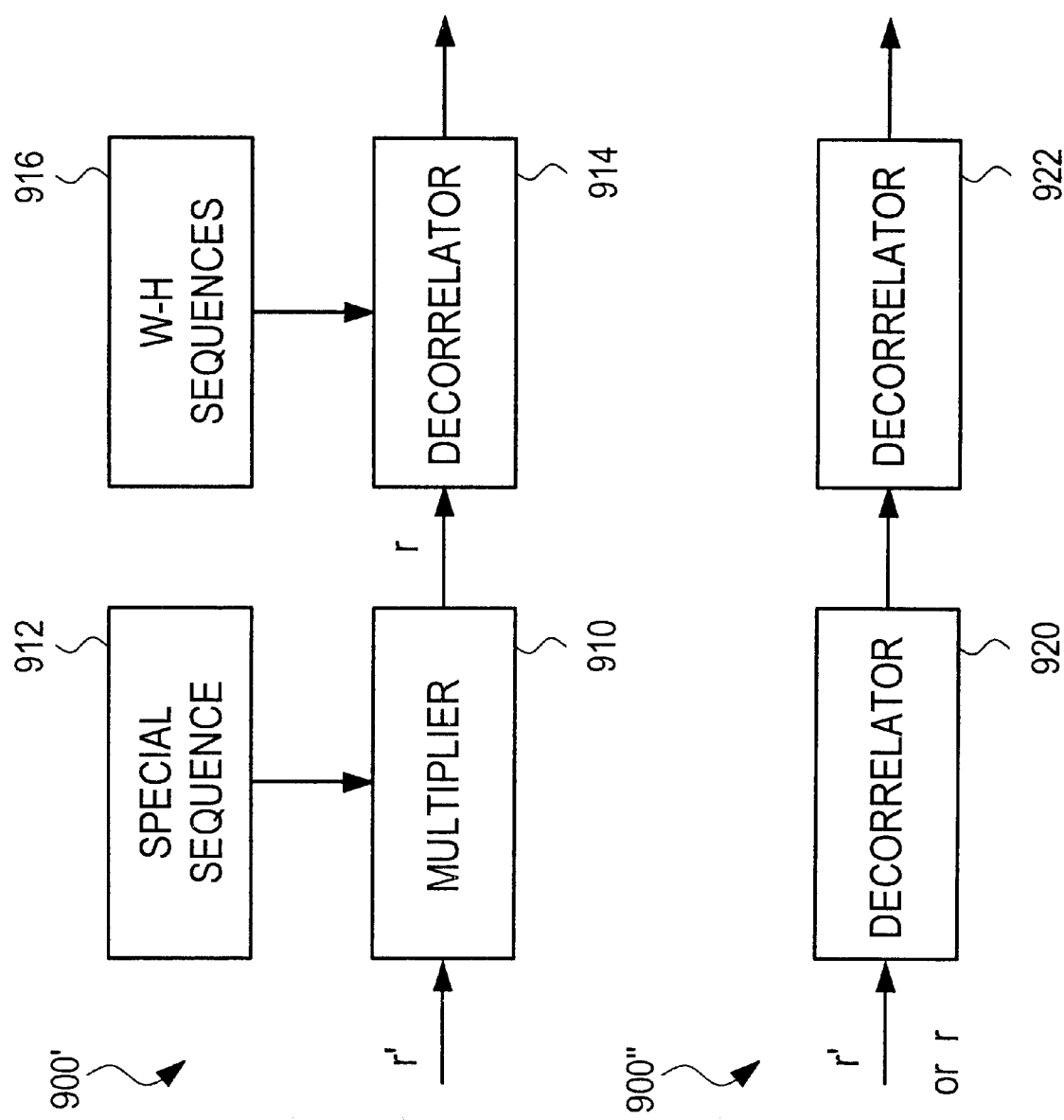

COMMUNICATION METHODS AND APPARATUS BASED ON ORTHOGONAL HADAMARD-BASED SEQUENCES HAVING SELECTED CORRELATION PROPERTIES

BACKGROUND

This invention relates generally to electrical telecommunication and more particularly to synchronizing transceivers of different users and even more particularly to methods and apparatus for synchronization based on orthogonal sequences having optimized correlation properties.

Modem communication systems, such as cellular and satellite radio systems, employ various modes of operation (analog, digital, and hybrids) and access techniques such as frequency division multiple access (FDMA), time division multiple access (TDMA), code division multiple access (CDMA), and hybrids of these techniques.

Digital cellular communication systems have expanded functionality for optimizing system capacity and supporting hierarchical cell structures, i.e., structures of macrocells, microcells, picocells, etc. The term "macrocell" generally refers to a cell having a size comparable to the sizes of cells in a conventional cellular telephone system (e.g., a radius of at least about 1 kilometer), and the terms "microcell" and "picocell" generally refer to progressively smaller cells. For example, a microcell might cover a public indoor or outdoor area, e.g., a convention center or a busy street, and a picocell might cover an office corridor or a floor of a high-rise building. From a radio coverage perspective, macrocells, microcells, and picocells may be distinct from one another or may overlap one another to handle different traffic patterns or radio environments.

FIG. 1 illustrates an exemplary hierarchical, or multi-layered, cellular system. An umbrella macrocell 10 represented by a hexagonal shape makes up an overlying cellular structure. Each umbrella cell may contain an underlying microcell structure. The umbrella cell 10 includes microcell 20 represented by the area enclosed within the dotted line and microcell 30 represented by the area enclosed within the dashed line corresponding to areas along city streets, and picocells 40, 50, and 60, which cover individual floors of a building. The intersection of the two city streets covered by the microcells 20 and 30 may be an area of dense traffic concentration, and thus might represent a hot spot.

FIG. 2 is a block diagram of an exemplary cellular mobile radiotelephone system, including an exemplary base station (BS) 110 and mobile station (MS) 120. The BS includes a control and processing unit 130 which is connected to a mobile switching center (MSC) 140 which in turn is connected to the public switched telephone network (PSTN) (not shown). General aspects of such cellular radiotelephone systems are known in the art. The BS1 110 handles a plurality of voice channels through a voice channel transceiver 150, which is controlled by the control and processing unit 130. Also, each BS includes a control channel transceiver 160, which may be capable of handling more than one control channel. The control channel transceiver 160 is controlled by the control and processing unit 130. The control channel transceiver 160 broadcasts control information over the control channel of the BS or cell to MSs locked to that control channel. It will be understood that the transceivers 150 and 160 can be implemented as a single device, like the voice and control transceiver 170, for use with control and traffic channels that share the same radio carrier.

The MS 120 receives the information broadcast on a control channel at its voice and control channel transceiver 170. Then, the processing unit 180 evaluates the received control channel information, which includes the characteristics of cells that are candidates for the MS to lock on to, and determines on which cell the MS should lock. Advantageously, the received control channel information not only includes absolute information concerning the cell with which it is associated, but also contains relative information concerning other cells proximate to the cell with which the control channel is associated, as described for example in U.S. Pat. No. 5,353,332 to Raith et al., entitled "Method and Apparatus for Communication Control in a Radiotelephone System".

In North America, a digital cellular radiotelephone system using TDMA is called the digital advanced mobile phone service (D-AMPS), some of the characteristics of which are specified in the TIA/EIA/IS-136 standard published by the Telecommunications Industry Association and Electronic Industries Association (TIA/EIA). Another digital communication system using direct sequence CDMA (DS-CDMA) is specified by the TIA/EIA/IS-95 standard, and a frequency hopping CDMA communication system is specified by the EIA SP 3389 standard (PCS 1900). The PCS 1900 standard is an implementation of the GSM system, which is common outside North America, that has been introduced for personal communication services (PCS) systems.

Several proposals for the next generation of digital cellular communication systems are currently under discussion in various standards setting organizations, which include the International Telecommunications Union (ITU), the European Telecommunications Standards Institute (ETSI), and Japan's Association of Radio Industries and Businesses (ARIB). Besides transmitting voice information, the next generation systems can be expected to carry packet data and to inter-operate with packet data networks that are also usually designed and based on industry-wide data standards such as the open system interface (OSI) model or the transmission control protocol/Internet protocol (TCP/IP) stack. These standards have been developed, whether formally or de facto, for many years, and the applications that use these protocols are readily available. The main objective of standards-based networks is to achieve interconnectivity with other networks. The Internet is today's most obvious example of such a standards-based packet data network in pursuit of this goal.

In most of these digital communication systems, communication channels are implemented by frequency modulating radio carrier signals, which have frequencies near 800 megahertz (MHz), 900 MHz, 1800 MHz, and 1900 MHz. In TDMA systems and even to varying extents in CDMA systems, each radio channel is divided into a series of time slots, each of which contains a block of information from a user. The time slots are grouped into successive frames that each have a predetermined duration, and successive frames may be grouped into a succession of what are usually called superframes. The kind of access technique (e.g., TDMA or CDMA) used by a communication system affects how user information is represented in the slots and frames, but current access techniques all use a slot/frame structure.

Time slots assigned to the same user, which may not be consecutive time slots on the radio carrier, may be considered a logical channel assigned to the user. During each time slot, a predetermined number of digital bits are transmitted according to the particular access technique (e.g., CDMA) used by the system. In addition to logical channels for voice or data traffic, cellular radio communication systems also provide logical channels for control messages, such as paging/access channels for call-setup messages exchanged by BSs and MSs and synchronization channels for broadcast messages used by MSs and other remote terminals for synchronizing their transceivers to the frame/slot/bit structures of the BSs. In general, the transmission bit rates of these different channels need not coincide and the lengths of the slots in the different channels need not be uniform. Moreover, third generation cellular communication systems being considered in Europe and Japan are asynchronous, meaning that the structure of one BS is not temporally related to the structure of another BS and that an MS does not know any of the structures in advance.

In such digital communication systems, a receiving terminal must find the timing reference of a transmitting terminal before any information transfer can take place. For a communication system using DS-CDMA, finding the timing reference corresponds to finding the boundaries of downlink (e.g., BS-to-MS) chips, symbols, and frames. These are sometimes called downlink chip-, symbol-, and frame-synchronizations, respectively. In this context, a frame is simply a block of data that can be independently detected and decoded. Frame lengths in today's systems typically fall in the range of ten milliseconds (ms) to twenty ms. This search of BS timing may be called a "cell search", and it includes identification of BS-specific downlink scrambling codes that are features of current DS-CDMA communication systems.

An MS or other remote terminal typically receives a signal that is a superposition (sum) of attenuated, faded, and disturbed versions of the signal transmitted by a BS. The slot and frame boundaries in the received signal are unknown to the MS to begin with, as are any BS-specific scrambling codes. The goal of the MS is thus to detect and identify one or more BSs in the noise-like (for DS-CDMA) received signal and to identify the scrambling code used.

In order to help synchronize the remote terminal to the BS and identify the BS-specific scrambling code, some communication systems provide that each BS signal includes an unscrambled part, which may be called a synchronization channel SCH, which the MS can lock onto and perform a cell search. Applicant's invention improves such synchronization channels in terms of both performance and MS complexity.

SUMMARY

In one aspect of Applicant's invention, a method of determining a scrambling code group for a received signal in a digital communication system is provided. Signals in the communication system are scrambled by respective scrambling codes; the scrambling codes are assigned to respective scrambling code groups; and identities of the scrambling code groups are encoded in the signals by respective cyclically distinct sequences of signed code words that are S-Hadamard sequences. The method includes the steps of: correlating the received signal to each of a plurality of the code words; coherently combining the correlations in accordance with cyclic shifts of each of a plurality of sequences of signs; and determining a maximal coherently combined correlation to identify the scrambling code group for the received signal.

In another aspect of Applicant's invention, a method of determining a scrambling code group for a received signal in a digital communication system, in which signals are scrambled by respective scrambling codes, the scrambling codes are assigned to respective scrambling code groups, identities of the scrambling code groups are encoded in the signals by respective cyclically distinct sequences of code words, is provided. The method includes the steps of: correlating the received signal to cyclic shifts of each of a plurality of sequences of code words that are S-Hadamard sequences; combining the correlations for each of the plurality of sequences of code words; and determining a maximal combined correlation to identify the scrambling code group for the received signal.

In another aspect of Applicant's invention, a digital radio transmission system having at least one transmitter and at least one receiver includes a device in the transmitter for generating a synchronization signal that includes signed versions of S-Hadamard sequences. The S-Hadamard sequences are obtained by position-wise scrambling a Walsh-Hadamard sequence with a special sequence having complex elements of constant magnitude. There is also included a device in the receiver for—estimating a time location and sequence identity of a received version of the synchronization signal.

In another aspect of Applicant's invention, a method of determining a time location of a received signal and identifying a Walsh-Hadamard sequence encoded as a S-Hadamard sequence included in the received signal is provided. The S-Hadamard sequence is a product of the Walsh-Hadamard sequence and a special sequence having complex elements of constant magnitude, and the Walsh-Hadamard sequence is a member of a first set of Walsh-Hadamard sequences. The method includes the steps of: forming a product of the received signal and the special sequence; and correlating the product with each of a plurality of Walsh-Hadamard sequences for identifying the Walsh-Hadamard sequence encoded in the received signal.

BRIEF DESCRIPTION OF THE DRAWINGS

Applicant's invention will be understood by reading this description in conjunction with the drawings, in which:

FIGS. 9A, 9B, 9C are block diagrams of parts of receivers in accordance with Applicant's invention.

DETAILED DESCRIPTION

This application describes the invention in a context of cell search in a cellular radio DS-CDMA communication system. It will be understood that this is just an example and that the invention can be applied in many other contexts.

Figure 3:
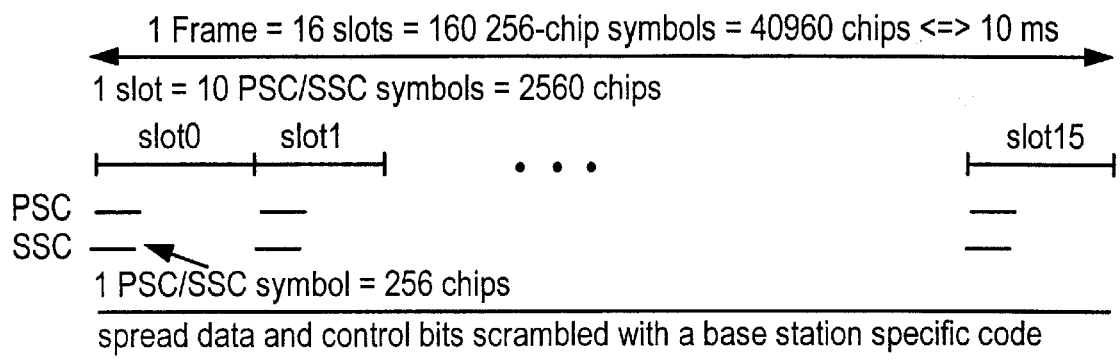
FIG. 3 illustrates a radio frame/slot/chip structure and a synchronization channel having a primary synchronization code and a secondary synchronization code.

FIG. 3 illustrates a 10-ms-long radio frame that comprises 40960 complex (in-phase and quadrature) chips divided among sixteen slots. Each slot thus includes 2560 chips, which represent ten 256-chip symbols. Such a frame/slot/chip structure is a feature of a third generation, wideband CDMA communication system under consideration by ETSI. The radio signal transmitted by a BS in such a communication system is the sum of spread and scrambled data and control bits and an unscrambled synchronization channel SCH. Data and control bits are typically spread by either bit-wise or block-wise replacement by an orthogonal sequence or sequences, such as Walsh-Hadamard sequences. (This is sometimes called m-ary orthogonal keying.) The spread results are then scrambled usually by bit-wise modulo-2 addition of a pseudo-noise (PN) scrambling sequence.

The SCH comprises two parts: a primary synchronization code (PSC) and a secondary synchronization code (SSC), both of which are transmitted once per slot. In FIG. 3, the PSC and SSC are illustrated as transmitted simultaneously but this is not necessary; the SSC may be transmitted in another part of the slot. In one form of WCDMA system, all BSs use the same PSC, which has a fixed relative position in the same slot(s) for all BSs. The example shown in FIG. 3 has the PSC located first in the slot. The position of the SSC may also be fixed (e.g., first in the slot as shown in FIG. 3), but the SSC value may vary from BS to BS. In fact, a different SSC value may be transmitted in different slots by the same BS. Nevertheless, the length-16 sequence of (possibly different) SSC values repeats periodically through the sequential frames transmitted by each BS.

As noted above, a remote terminal such as a MS receives from a transmitter such as a BS a signal that is a sum of attenuated, faded, and disturbed versions of the signal actually transmitted by the BS. To the remote terminal, the slot and frame boundaries of the received signal, as well as the scrambling codes used by the transmitter are initially unknown. The goal of the remote terminal is to determine the frame/slot/chip structure of the noise-like received signal and to identify the scrambling code used.

One way to achieve this goal is to establish the frame timing and then use brute force to identify the scrambling code by correlating a received frame with all scrambling code candidates. This is a very complex and power-expensive procedure if the number of candidates is large, as it would likely be in a high-capacity (small cell) communication system.

A better way to achieve the goal is to divide the set of possible scrambling codes into groups, each of which includes a smaller number of codes, and to encode the group identity into the sequence of SSCs. Thus, by detecting the sequence of SSCs, which may extend over some or all of the slots in a received frame or frames, the remote terminal ascertains the small subset of all possible scrambling codes to which the BS scrambling code belongs. Then, the remote terminal can correlate the received information with each of the more reasonable number of scrambling code candidates in the subset in order to ascertain the particular BS scrambling code. In both of the methods described below, SSC sequences are selected such that both the scrambling code group identity and the frame timing can be obtained simultaneously.

In describing the two alternative methods below, the SSCs, which may be modulated, have length 256 and are taken from the set of length-256 orthogonal Gold codes. The PSC sequence may also be taken from that set of Gold codes. It will be appreciated, of course, that these are merely examples and that other lengths and types of orthogonal codes may be used instead. In fact, the PSC and SSCs need not be orthogonal in general, although orthogonality is usually preferred.

A common first step for the two methods (see FIG. 4) is slot and chip synchronization. In a communication system having a synchronization channel like the WCDMA proposals with an unscrambled common PSC, the remote terminal may pass the received signal (after removing the carrier, etc.) through a filter matched to the PSC. Such a matched filter can be implemented in software executed by the remote terminal's processor 180 or in hardware by, for example, a suitably tapped delay line or shift register. Other communication systems might employ other devices or methods of obtaining slot and chip synchronization.

It will be appreciated that it is not necessary in general to have slot synchronization; a receiver could scan for the SSCs having established only chip, or bit, synchronization. One way to do this would be by using matched filters corresponding to candidate SSCs set at a few selected delays since the receiver would not have slot synchronization. Nevertheless, it will be recognized that the number of possible starting positions without slot sync is the number of chips or bits in a frame rather than the number of slots. In the currently proposed WCDMA systems, there are 40960 chips in each frame and only sixteen slots. Thus, besides facilitating detection of the presence of a carrier signal, an unscrambled PSC transmitted in one or more slots gives a clear advantage to a communication system in that the number of possible frame start positions is reduced from the number of chips in a frame to the number of slots including the PSC.

Figure 4:
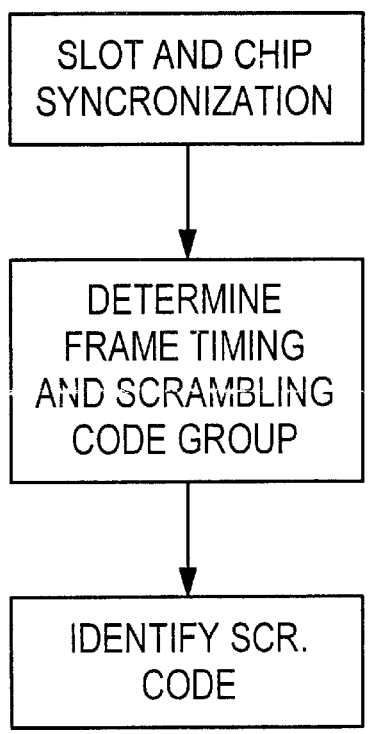
FIG. 4 is a flow chart of a method in accordance with Applicant's invention.

In the next common step shown in FIG. 4, the receiver determines the sequence of SSCs and hence the frame timing and group identity. In the third step, also common to both methods, trial descramblings of the received data are generated using all of the candidates in the code group identified by the preceding step.

Figure 5:
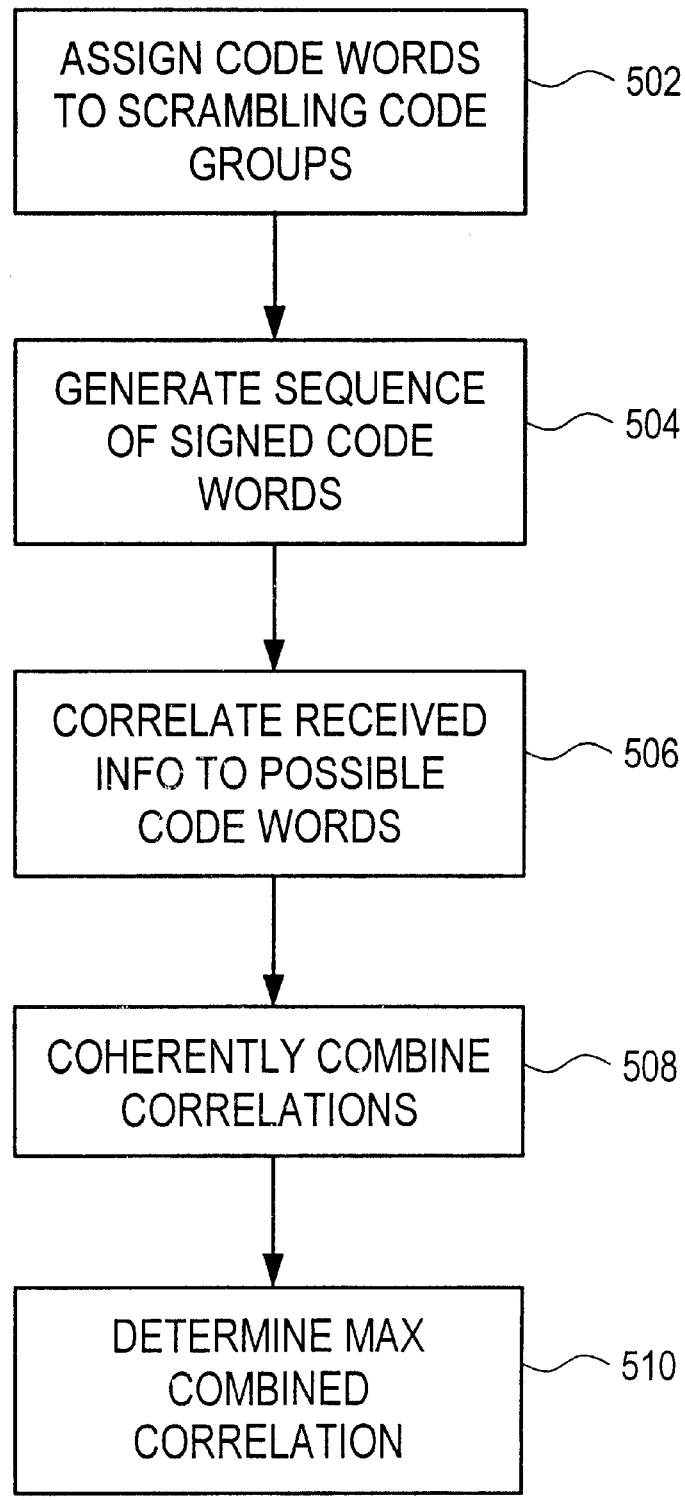
FIG. 5 is a flow chart of a method of determining a scrambling code group in accordance with Applicant's invention.
Figure 6:
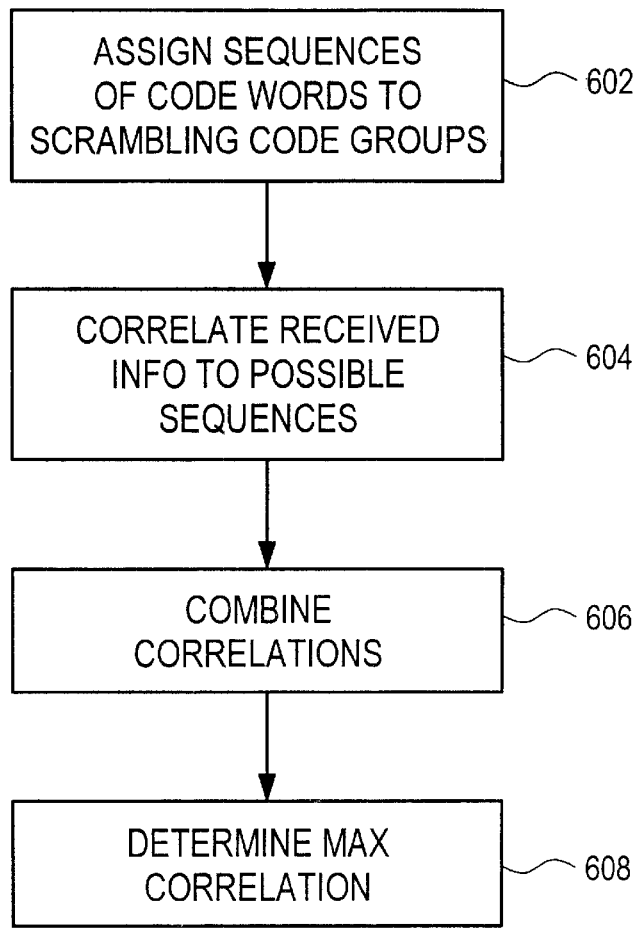
FIG. 6 is a flow chart of another method of determining a scrambling code in accordance with Applicant's invention.

In order for step 1 of the method shown in FIG. 4 to perform well in a WCDMA-like communication system, the PSC sequence must have good aperiodic autocorrelation properties. "Good" autocorrelation properties are such that the value of the correlation of a code word or sequence with shifts of that code word or sequence is small except for the zero shift. Aperiodic properties are important in situations in which the code word or sequence is not continuously transmitted such as the currently proposed WCDMA systems, in which the PSC sequence is only one of nine symbols sent in each slot. Since a matched filter looking for the PSC is influenced only by the PSC occurring in the particular slot passing through the filter, not by PSCs occurring in preceding or following slots, it is the aperiodic autocorrelation properties of the PSC that are important. Good aperiodic autocorrelation properties can be assured by either of the two exemplary methods described below that are illustrated by FIGS. 5 and 6.

Method 1

Assume without loss of generality that there are 512 scrambling codes divided into thirty-two groups of sixteen codes each. To each group 1, assign a code word $C_l$ for representing that group in the SCH, e.g., by the sequence of SSCs in a frame (step 502 in FIG. 5). The assigned code words could be communicated to the remote terminal or stored in advance in a suitable memory in the terminal. If the code word $C_l$ were simply transmitted as the SSC in each slot of a frame, then the receiver's determining $C_l$ would determine the scrambling code group (and the slot timing, if the PSC were not sent in each slot) but not the frame timing (frame synchronization). Therefore in accordance with one aspect of Applicant's invention, a signed version of $C_l$ is transmitted in each of some or all of the slots in a frame or frames. The slot-specific signs are selected (step 504 in FIG. 5) such that the sequence of SSCs in a frame comprises a length-16 cyclically distinct sequence having good periodic autocorrelation properties.

Accordingly, if $m_i$ is the sign of the code word $C_l$ in the i-th slot, the transmitted sequence of SSCs in a frame will be as follows for a frame having sixteen slots:

$$[m_1C_l, m_2C_l, \ldots, m_{15}C_l, m_{16}C_l]$$

By correlating the received slot information with all possible code words $C_l$ (step 506 in FIG. 5) and by coherently combining these correlation values according to sign sequences corresponding to all cyclic shifts of the sequence $[m_1, m_2, \ldots, m_{15}, m_{16}]$ (step 508 in FIG. 5), both the code word $C_l$ and the phase of $[m_1, m_2, \ldots, m_{15}, m_{16}]$ that maximizes the combined correlation value can be determined (step 510 in FIG. 5).

It will be understood that in order to combine the slot/code-word correlation values coherently, a channel estimate is necessary, which involves the receiver's determining the weight function or impulse response of the communication channel. For coherent digital amplitude modulation and transmission through a fading channel in a WCDMA-like system, such channel-response estimation can be based on the known PSC, e.g., by correlating the received slot(s) information with the known PSC. Aspects of channel estimation in digital radio communication systems are described in U.S. Pat. No. 5,768,307 to P. Schramm et al. for "Coherent Demodulation with Decision-Directed Channel Estimation for Digital Communication".

Method 2

This method is based on forming sequences of the members of a small set of different code words $C_l$ that are sufficient to unambiguously identify each group of scrambling codes (step 602 in FIG. 6). It may again be assumed without loss of generality that there are 512 scrambling codes divided into thirty-two groups of sixteen codes each. By way of example only, let there be seventeen code words $C_l$ and frames having sixteen slots each. An "alphabet" of seventeen "letters" or symbols can form many length-16 letter sequences, and many of such sequences can be proved to have reasonably good periodic autocorrelation and cross-correlation properties. Such sequence construction methods are described in "Comma Free Codes for Fast Long Code Acquisition", Doc. No. AIF/SWG2-15-6(P), IMT-2000 Study Committee, Air Interface Working Group, SWG2, which was a contribution by Texas Instruments Inc.

"Good" cross-correlation properties are such that the value of the correlation of a code word or sequence with any other code word or sequence and with any relative shifts of the code words or sequences is small. Periodic properties are important in situations in which the code word or sequence is continuously transmitted such as the currently proposed WCDMA systems, in which the sixteen-symbol sequence of SSCs is repeated from frame to frame. Although the SSC is only one of the ten symbols sent in each slot and is in that sense not continuously transmitted, it is possible with slot synchronization established to avoid searching for the SSCs in 9/10 of the frame and thus to treat the SSCs as if they were continuous. Given any sixteen consecutive slots, therefore, the receiver can know that it has captured at least an arbitrary symbol-wise cyclic shift of the entire sixteen-symbol sequence.

Of the many possible length-16 letter sequences, thirty-two would be selected based on their correlation properties to represent respective ones of the SSC sequences. As in Method 1, the selected sequences can be communicated to the remote terminal or stored in advance in a suitable memory in the terminal. It may be noted, however, that the sequences formed according to Method 1 are currently believed to have slightly better correlation properties than those formed according to Method 2.

The sequences of SSC code words $C_l$ are constructed by selecting code words from the "alphabet" of seventeen code words such that the sequences are code-word-wise cyclically distinct and so that they have good mutual cross-correlation properties. For example, suppose one has two "letters" A and B, which are mutually orthogonal length-256 sequences like SSCs, and further suppose one is interested in length-8 sequences of such "letters". If one starts with the sequence AAAAABBA, then one cyclic shift of that sequence is AAAAAABB, which is distinct from the original sequence AAAAABBA. One code-word-wise non-cyclically distinct sequence is ABABABAB, and another (even more so) is AAAAAAAA. For the latter, it will be recognized that all cyclic shifts are the same, and for the former it will be recognized that some cyclic shifts are the same. Of course, it will be understood that a shift by the length of a sequence (i.e., a shift by the number of symbols) is just the original sequence again, which does not render the sequence code-word-wise cyclically non-distinct.

Another two code-word-wise cyclically distinct sequences are ABBBBBBB, which for convenience may be called Seq1, and ABBAAABB, which for convenience may be called Seq2. The following table shows the number of sequence positions in which the original sequence and each shifted sequence agree, i.e., have the same "letter".

| shift: | 0 | 1 | 2 | 3 | 4 | 5 | 6 | 7 |
|---|---|---|---|---|---|---|---|---|
| Seq1: | 8 | 6 | 6 | 6 | 6 | 6 | 6 | 6 |
| Seq2: | 8 | 4 | 2 | 4 | 4 | 4 | 2 | 4 |

From this table, it can be seen that Seq2 has "better" autocorrelation properties than Seq1 because as noted above "good" autocorrelation properties are such that the value of the correlation of a code word or sequence with shifts of that code word or sequence is small except for the zero shift. For sequences that are not cyclically code-word-wise distinct, the number of agreements would be 8 (maximal) for at least one non-zero shift. It will be understood that the number of agreements is related to the correlation value in that the correlation (either auto- or cross-) is usually defined as the number of agreements less the number of disagreements.

The cross-correlation between Seq1 and Seq2, i.e., the number of sequence positions in which Seq1 and Seq2 have the same "letter" as Seq1 is shifted position by position through Seq2 and wrapped, is given by the following table.

| relative shift: | 0 | 1 | 2 | 3 | 4 | 5 | 6 | 7 |
|---|---|---|---|---|---|---|---|---|
| agreements: | 5 | 3 | 3 | 5 | 5 | 5 | 3 | 3 |

A good set of code words is such that it is unlikely to mistake one code word for another and/or for a shift of the one or another code word. In a similar way, the received slot information is correlated with all possible code word sequences at all shifts (step 604 in FIG. 6).

It will be noted that the code words $C_I$ are not signed as in Method 1, and thus non-coherent combination of the correlations of the received slots with their respective code words is possible (step 606 in FIG. 6). For example, let $C_i=C(SSC_i, R_i)$ be the correlation between $R_i$, the received information in the i-th slot, and $SSC_i$, the i-th SSC in a hypothesized sequence of SSCs. Then, the sum of $C_i$ taken over i is the correlation between the hypothesized sequence and the received information, but since the several $R_i$ are subject to unknown and different fading or other transmission disruptions, non-coherent combining is necessary in the absence of channel estimates. In other words, the sum of the squares of the magnitudes of $C_i$ taken over i is the measure. If channel estimates $a_i$ are available, then the correlation values can be coherently combined by taking the sum over i of the products of $C_i$ and the complex conjugates of $a_i$. With Method 1, coherent combining is necessary because the signs $m_i$ must be retained, but with Method 2, either coherent or non-coherent combining can be used.

Accordingly, if $C_i$ is the SSC in the i-th slot, the transmitted SSC sequence will be as follows for a frame having sixteen slots:

$$[C_1, C_2, \ldots, C_{15}, C_{16}]$$

Determining the maximal correlation value obtained from correlating the received slot information with all possible SSC sequences at all shifts identifies the frame timing and the sequence $[C_I, C_2, \ldots, C_{15}, C_{16}]$ that identifies the scrambling code group (step 608 in FIG. 6).

As noted above, the synchronization codes PSC and SSC may be orthogonal Gold codes of length 256. Such synchronization codes are used in the WCDMA communication systems that are under consideration by ETSI and ARIB. The PSC sequence in currently proposed WCDMA systems is chosen from the set of length-256 orthogonal Gold codes such that the chosen sequence has the largest merit factor (MF), which is defined as the square of the zero-lag aperiodic autocorrelation value divided by the sum of squared non-zero-lag aperiodic autocorrelation values. Alternatively, the figure of merit could be the maximal out-of-phase peak magnitude of the autocorrelation function.

One aspect of such codes, and of various other types of codes for that matter, is that the autocorrelation properties of orthogonal Gold codes are not necessarily the best. Although the autocorrelation properties of a Gold code sequence chosen based on such criteria are not bad, it is desirable to find sequences that have better properties.

In addition, the use of orthogonal Gold codes increases the complexity of the receiver because the receiver has to perform many 256-chip correlations on each slot's information in real time to keep up with the incoming signal. The well known Walsh-Hadamard sequences can be efficiently decorrelated with a Fast Walsh Transform (FWT), yielding a simple receiver. Methods and apparatus for performing an FWT are described in U.S. Pat. No. 5,357,454 to Dent for "Fast Walsh Transform Processor", which is expressly incorporated here by reference. Walsh-Hadamard sequences have structural properties that make correlation of a received sequence with the Walsh-Hadamard sequences possible to do with much less complexity than brute force correlations. The results of an FWT operation are substantially identical to correlating the received sequence with all Walsh-Hadamard sequences of a given length.

Moreover, for applications such as the WCDMA communication systems currently proposed, it is necessary only to use a subset of a family of Walsh-Hadamard sequences, and thus only a subset of the results of the FWT are of interest. Although the FWT is efficient, a complete FWT would perform unnecessary operations. If the subset of Walsh-Hadamard sequences is chosen with care, decorrelations can be done with a FWT of smaller order than the full FWT. From a complexity point of view, therefore, the Hadamard sequences are suitable. Nevertheless, Walsh-Hadamard sequences have very bad autocorrelation properties and are thus unsuitable for the purpose of cell search.

In general, one would like a set of orthogonal sequences of which at least one has aperiodic autocorrelation properties that are as good or better than those of the Gold code sequence described above and could serve as PSC and SSC sequences. One would also like to have a family of sequences that can be efficiently decorrelated at the receiver. These goals can be met by a set of orthogonal sequences that are based on Walsh-Hadamard sequences but that can have better autocorrelation properties. In this application, these sequences are called S-Hadamard sequences.

In accordance with one aspect of the invention, each Walsh-Hadamard sequence is position-wise multiplied by a special complex sequence S having unit-magnitude components. The special sequence S is carefully selected such that the members of the resulting set of S-Hadamard sequences have good autocorrelation and cross-correlation properties due to the S sequence. The construction of sequences according to their correlation properties is described in U.S. Pat. No. 5,353,352 to P. Dent et al. for "Multiple Access Coding for Radio Communications" and U.S. Pat. No. 5,550,809 to G. Bottomley et al. for "Multiple Access Coding Using Bent Sequences for Mobile Radio Communications". These patents are expressly incorporated here by reference.

Let $H_M$ be a M×M Walsh-Hadamard matrix normalized so that the all-ones sequence appears as the top row of the matrix. The Walsh-Hadamard sequences are given by the M rows of this matrix, and the entries in $H_M$ (the components of the sequences) are either +1 or −1. The matrix $H_M$ is generated in the usual way according to the following expression:

$$H_M = \begin{bmatrix} H_{M/2} & H_{M/2} \\ H_{M/2} & -H_{M/2} \end{bmatrix}$$

with $H_1=[+1]$. These are the so-called Sylvester-type Hadamard matrices.

Permuting rows or columns in $H_M$ or multiplying any row or column by −1 still yields Hadamard matrices. The criteria for choosing sequences among the rows described below is valid for Sylvester-type matrices and may change in a straightforward way for other types of Hadamard matrices. Without any loss of generality, the following description uses Sylvester-type matrices in the examples.

Let $[h_{i,0}, h_{i,1}, \ldots, h_{i,M-1}]$ be the i-th Hadamard sequence, and let $S=[s_0, s_1, \ldots s_{M-1}]$ be the special sequence S having complex elements of constant magnitude (unit magnitude in this example). Then, the i-th S-Hadamard sequence is given by:

$$[l_{i,0}, c_{i,1}, \ldots, c_{i,M-1}] = [s_0 h_{i,0}, s_1 h_{i,1}, \ldots, s_{M-1} h_{i,M-1}]$$

which can be viewed as the result of a transmitter's scrambling a Walsh-Hadamard code word with the sequence S.

The cross-correlation between the i-th and the j-th S-Hadamard sequence is given by the following expressions:

$$[c_{i,0}, c_{i,1}, \ldots, c_{i,M-1}] \cdot [\bar{c}_{j,0},$$

$$\bar{c}_{j,1} \ldots, \bar{c}_{j,M-1}]^T =$$

$$(h_{i,0} \bar{h}_{j,0} s_0 s_0 + \ldots + h_{i,M-1} \bar{h}_{j,M-1} s_{M-1} s_{M-1})$$

$$M-1 = (h_{i,0} \bar{h}_{j,0} + \ldots + h_{i,M-1} \bar{h}_{j,M-1}) = (h_{i,0} h_{i,1}$$

$$\ldots h_{i,M-1}) \cdot (\bar{h}_{j,0} \bar{h}_{j,1} \ldots \bar{h}_{j,M-1})^T$$

which equals M if i=j and zero otherwise, since the original Walsh-Hadamard sequences are mutually orthogonal. Hence, the S-Hadamard sequences are also orthogonal.

It can be noted that the first row in $H_m$ is the all-ones sequence and hence the corresponding S-Hadamard sequence is the special sequence S itself, as follows:

$$[c_{0,0}, c_{0,1}, \ldots c_{0,M-1}] = [s_0, s_1, \ldots, s_{M-1}] = S$$

Thus, by choosing S such that it has good aperiodic autocorrelation properties, the set of orthogonal S-Hadamard sequences has at least one member that also has these good autocorrelation properties.

There are several ways to design a sequence that has autocorrelation properties that are at least as good as Gold sequences that will be used in the currently proposed WCDMA systems. One simple way is to choose the currently proposed PSC sequence as the special sequence S. Then, as noted above, one of the S-Hadamard sequences will be the special sequence S, and the new PSC sequence, too, if the all-ones Walsh-Hadamard sequence is chosen as the basis for the new PSC sequence!

Another way is to choose one of the sequences in a so-called complementary pair of sequences, which are described in S. Z. Budišsin, "New Complementary Pairs of Sequences", *Electronics Letters*, vol. 26, no. 8, pp. 881–883 (Jun. 21, 1990), and S. Z. Budišsin, "New Multilevel Complementary Pairs of Sequences", *Electronics Letters*, vol. 26, no. 22, pp. 1861–1863 (Oct. 25, 1990). Both of these publications are expressly incorporated here by reference. Such sequences are known to include sequences having good autocorrelation properties. In general, a complementary pair of sequences S and S' have the property that the sum of their respective aperiodic autocorrelation function is zero for all non-zero lags. Only one member of a complementary pair is needed for this application, however.

As explained in the Budišsin publications cited above, real multilevel complementary sequences $a_n$ and $b_n$ can be generated according to the following expressions:

$$a_1(i) = \delta(i) \qquad b_1(i) = \delta(i)$$

$$a_{n+1}(i) = a_n(i) + W_n b_n(i - S_n) \qquad b_{n+1}(i) = a_n(i) - W_n b_n(i - S_n)$$

where $\delta(i)$ is the Kronecker delta function; n is the number of the iteration; $n \in 1, 2, \ldots, N-1$; $W_n$ are coefficients having values of either +1 or −1; $S_n$ are arbitrary positive delays, and i is an integer representing the time scale.

Real multilevel complementary sequences can also be generated as described in the Budišsin publications according to the following expressions:

$$a_0(i) = \delta(i) \qquad b_0(i) = 0$$

$$a_{n+1}(i) = a_n(i) + A_n b_n(i - S_n) \qquad b_{n+1}(i) = A_n a_n(i) - b_n(i - S_n)$$

again where $\delta(i)$ is the Kronecker delta function; $n \in 1, 2, \ldots, N-1$; $A_n$ are real parameters; $S_n$ are arbitrary positive delays, and i is an integer representing the time scale.

Applicant has evaluated all of the complementary pairs of length-256 sequences of binary elements that are produced by the algorithm described in the Budišsin publications cited above. The following table is a comparison of the MF and maximum peak magnitude for a PSC sequence that is an orthogonal Gold sequence to a complementary sequence optimized with respect to the MF and to a complementary sequence optimized with respect to the maximum peak magnitude.

| S | MF | maximum peak magnitude |
|---|---|---|
| orthogonal Gold | 2.7 | 18 |
| complem. pair (best MF) | 4.5 | 25 |
| complem. pair (best peak) | 3.1 | 12 |

From the table, it can be seen that there are indeed sequences with better figures of merit (either MF or maximum peak magnitude) than an orthogonal Gold code PSC.

As one particular example of complementary-pair sequences that would be suitable for a WCDMA system as currently proposed, one can advantageously employ the following for the sequences $S_n$ and $W_n$ in the algorithms described in the Budišsin publications cited above:

$$[S_1, S_2, \ldots, S_8] = [1, 2, 8, 64, 4, 128, 32, 16]$$

$$[W_1, W_2, \ldots, W_8] = [1, 1, 1, 1, 1, -1, 1, 1]$$

to obtain a sequence $[a_n(i)]$, where n=8 and $i \in 0, 1, \ldots, 255$, having the best MF found for such sequences.

As another particular example of complementary-pair sequences that would be suitable for a WCDMA system as currently proposed, one can advantageously employ the following for the sequences $S_n$ and $W_n$ in the algorithms described in the Budišsin publications cited above:

$$[S_1, S_2, \ldots, S_8] = [32, 1, 16, 2, 4, 128, 8, 64]$$

$$[W_1, W_2, \ldots, W_8] = [1, 1, -1, 1, 1, -1, -1, 1]$$

to obtain a sequence $[a_n(i)]$, where n=8 and $i \in 0, 1, \ldots, 255$, having the lowest maximum non-zero-lag correlation peak found for such sequences.

Many sequences among the complementary pairs of sequences have better merit factors MF or better maximum peak magnitudes than Gold codes, and hence such sequences can be used advantageously as the special sequence S. The complementary pairs of sequences are especially suited to this application since their lengths match those of the Sylvester-type Walsh-Hadamard sequences, i.e., they are integer powers of two.

In general, many sequences having good correlation properties can be constructed, but many of those have lengths that do not match the Walsh-Hadamard sequences. Thus, such sequences can not be used without modification (and consequently changed correlation properties).

The position-wise multiplication of the Walsh-Hadamard sequences and the special sequence S destroys the structural properties of the Walsh-Hadamard sequences that allow efficient decorrelation by an FWT. Nevertheless, representing a received signal as a received complex sequence r' that is given by:

$$r'=[r'_0, r'_1, \ldots, r'_{M-1}]$$

the receiver may as a first step multiply r' position-wise by the complex conjugate of the special sequence S to form a sequence r that is given by:

$$r=[r_0, r_1, \ldots, r_{M-1}]=[r'_0 \bar{s}_0, r'_1 \bar{s}_1, \ldots, r'_{M-1} \bar{s}_{M-1}]$$

which can be viewed as the result of the receiver's descrambling a Walsh-Hadamard sequence based on the sequence S. The sequence r can then be correlated with the Walsh-Hadamard sequences of interest, e.g., by using an FWT, in order to find the most likely candidate.

The correlation of one received length-M sequence with a bank of M length-M candidate sequences generally requires on the order of $M^2$ operations. Using S-Hadamard sequences, the correlation of the sequence r requires only on the order of $M \cdot \log_2 M$ operations since the FWT can be utilized. Of course, there might be circumstances in which it is useful to determine S-Hadamard sequences received by brute force, i.e., by simply correlating the received signal to candidate S-Hadamard sequences.

Figure 7:
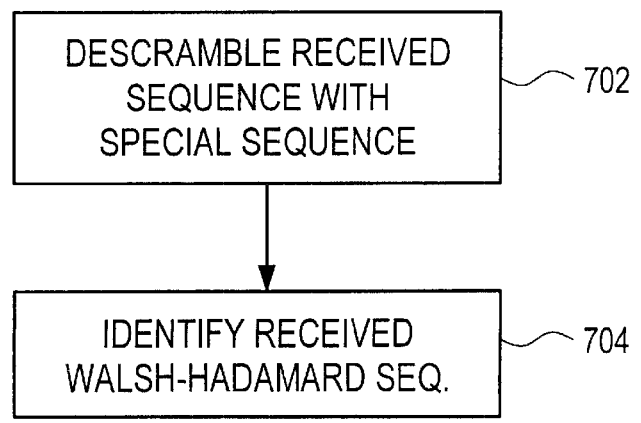
FIG. 7 is a flow chart of a method of determining a Walsh-Hadamard sequence that is encoded as an S-Hadamard sequence included in a received signal.

To summarize as illustrated in FIG. 7, one advantageous method of generally determining a Walsh-Hadamard sequence that is encoded as an S-Hadamard sequence r included in a received signal r', e.g., as a PSC or SSC, comprises the following steps that can be implemented in a receiver either in hardware such as an application-specific integrated circuit or in software executed by the receiver's processor:

1. descramble the received sequence r' using the special sequence S to get r (step 702); and
2. identify the received Walsh-Hadamard code word, e.g., by performing an M-point FWT on r (step 704). If desired, of course, the received S-Hadamard sequence can be derived by multiplication as explained above. The special sequence S can be either communicated to the receiver, e.g., as the S-Hadamard sequence based on the all-ones Walsh-Hadamard sequence noted above, or the candidate S sequences can be stored in the receiver or locally generated there in another way.

As noted above, the synchronization channel in the currently proposed WCDMA communication systems can employ only a subset of all possible M-length Walsh-Hadamard sequences, where M is identified with the number of slots in a frame. In Method 1 described above, the number of members of the subset is just the number of scrambling code groups (thirty-two, in the example). In the example illustrating Method 2, seventeen sequences are needed. Considering also the need for a sequence to be used as the PSC, a subset that included either thirty-three (for Method 1) or eighteen (for Method 2) length-16 sequences would be useful for the example system. The following describes sequence subsets having a cardinality of a power of two and then the general case of non-power of two cardinalities, such as thirty-three and eighteen.

Let M be the total number and length of the sequences and let N be the number of sequences used of the M sequences. Also, let M and N be integer powers of two and let L=M/N. Then, let the N used sequences be defined as:

$$[s_0 h_{i \cdot L+k, 0}, s_1 h_{i \cdot L+k, 1}, \ldots, s_{M-1} h_{i \cdot L+k, M-1}] \text{ for } i=0,1, \ldots, N-1$$

for any k=0, 1, . . . , L−1, which is to say that the Walsh-Hadamard sequences chosen are taken as every L-th row in the matrix $H_M$ starting from row k. These chosen sequences are then scrambled with the special sequence S in order to adjust their autocorrelation properties. The subset of Walsh-Hadamard sequences is advantageously chosen such than an N-point FWT can be applied by the receiver.

Closer inspection of the chosen Walsh-Hadamard sequences reveals that each of the N length-M sequences is a concatenation of N signed copies of a subsequence S' of length L. The subsequence S' is the same for all Walsh-Hadamard sequences, but the sign patterns are different, as can be seen from the following:

$$[h_{i \cdot L+k, 0}, h_{i \cdot L+k, 1}, \ldots, h_{i \cdot L+k, M-1}]=[h'_{i, 0}S', h'_{i, 1}S', \ldots, h'_{i, n-1}S']$$

where $h'_{i, j}$ is the sign before the j-th copy of S' in the i-th Walsh-Hadamard sequence. Depending on k, the sequence S' will look different.

It may be recognized that the sign matrix $H'_N=[h'_{i, j}]$ is itself a Hadamard matrix of order N. This suggests for example the following modification of the method illustrated by FIG. 7 that can be implemented in a receiver when the number of used sequences N and the sequence length M are integer powers of two:

1. descramble a received complex sequence r' with the special sequence S to get the sequence r (step 702);
2. perform N consecutive correlations of the N length-L consecutive subsequences of r with S' to get a length-N sequence r" (step 704); and
3. perform an N-point FWT on r" to identify the N-length Walsh-Hadamard sequence received (also step 704). It can also be noted that steps 1 and 2 can be combined so that a simpler modification of the method illustrated by FIG. 7 includes the steps of:
   1. perform N consecutive correlations of the N length-L consecutive subsequences of the received complex sequence r' with short sequences $S'_1, \ldots, S'_N$ to get a length-N sequence r" (step 702); and
   2. perform an N-point FWT on r" to identify the N-length Walsh-Hadamard sequence received (step 704).

The short sequence $S'_i$ corresponds to the position-wise multiplication of the i-th length-L subsegment of S with S'. Thus, descrambling and forming partial correlations are performed simultaneously.

If the number of used sequences is not an integer power of two as in the examples described above, one can perform a 32-point FWT and one ordinary correlation to handle a subset having thirty-three members, and one can perform a 16-point FWT and two ordinary correlations to handle a subset having eighteen members. The length-32 and length-16 sequences used should be chosen as described above and the additional one or two sequences can be any sequence(s) not included in those thirty-two or sixteen sequences.

Alternatively for a number of sequences that is a non-integer-power-of-two, e.g., forty-eight (out of, say, 256), the receiver could perform steps 2 and 3 above twice: once with N=32 and once with N=16. (The S', L, and k will also differ.) The 32+16 sequences must be carefully chosen according to the criteria above and not to coincide. This reasoning is easily extended to any number of sequences less than M since any number is a sum of a number of integer powers of two. One could also use a small-order FWT that is larger than necessary, e.g., a 64-point FWT, and simply not use sixteen of the resultant correlation values.

As shown above, there are many ways of dealing with the case of N not being an integer factor of two.

Figure 8:
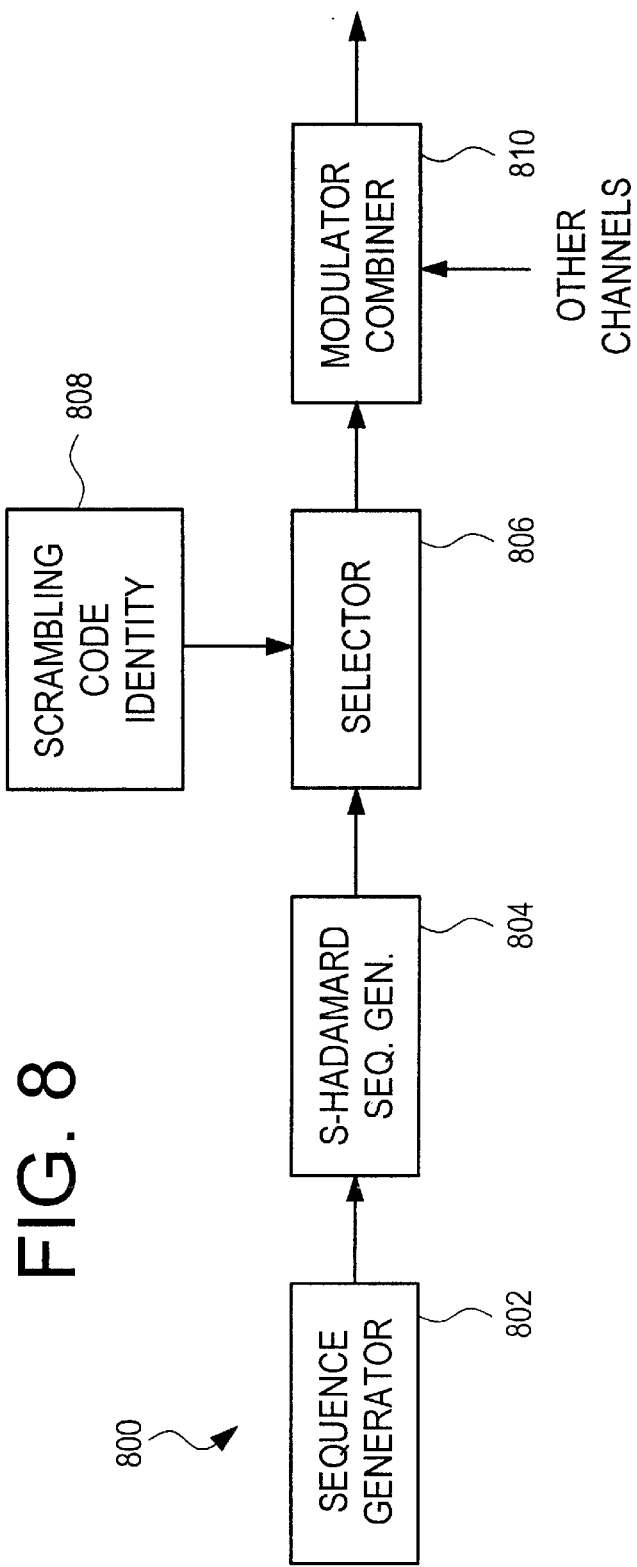
FIG. 8 is a block diagram of part of a communication system transmitter in accordance with Applicant's invention.

A block diagram of part of a communication system transmitter 800 in accordance with Applicant's invention is shown in FIG. 8. A generator 802 produces a suitable special sequence S that is provided to a generator 804 for producing a set of S-Hadamard code words. The generator 804 may include a device for generating, e.g., recursively, a set or a subset of M-length Sylvester-type Walsh-Hadamard sequences and a multiplier for forming products of the special sequence S and the members of the M-length Walsh-Hadamard set or subset. As an alternative, the generator 804 may include a suitable memory for storing the members of a set or subset of M-length Walsh-Hadamard sequences and a multiplier. Particular members of the set or subset of S-Hadamard code words are chosen by a selector 806 on the basis of a desired scrambling code group identity provided by a generator 808, which may be a memory that stores predetermined group identities. The sequence of selected S-Hadamard code words, which may be a PSC and SSCs as described above, are provided to a modulator/combiner 810 for producing the signal eventually transmitted, e.g., the signal provided to the control channel transceiver 160 (see FIG. 2). The modulator/combiner 810 also may receive signals corresponding to other communication channels or information that are combined with the sequence of selected S-Hadamard code words.

Figure 1:
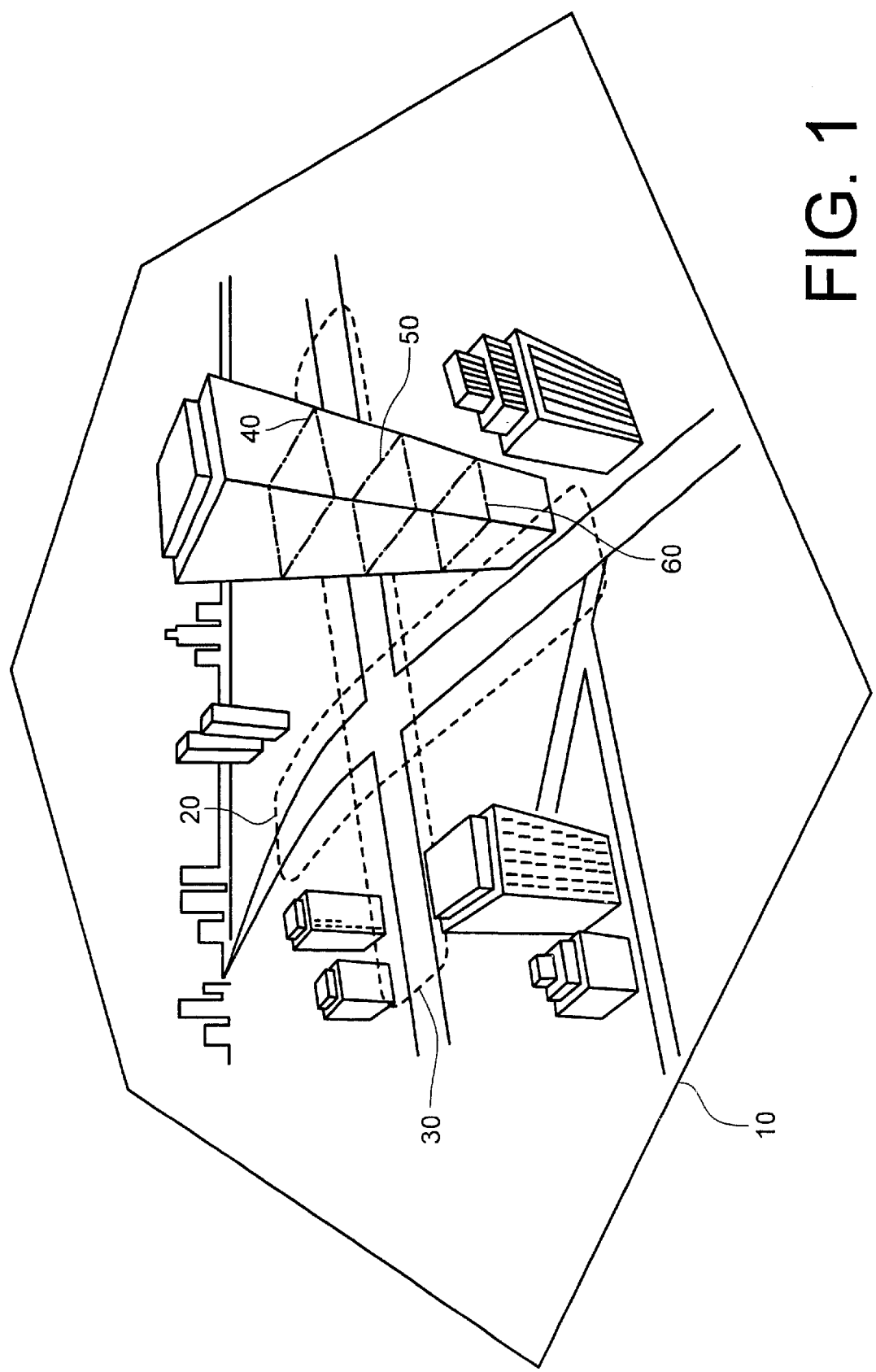
FIG. 1 illustrates an exemplary hierarchical, or multi-layered, cellular communication system.
Figure 2:
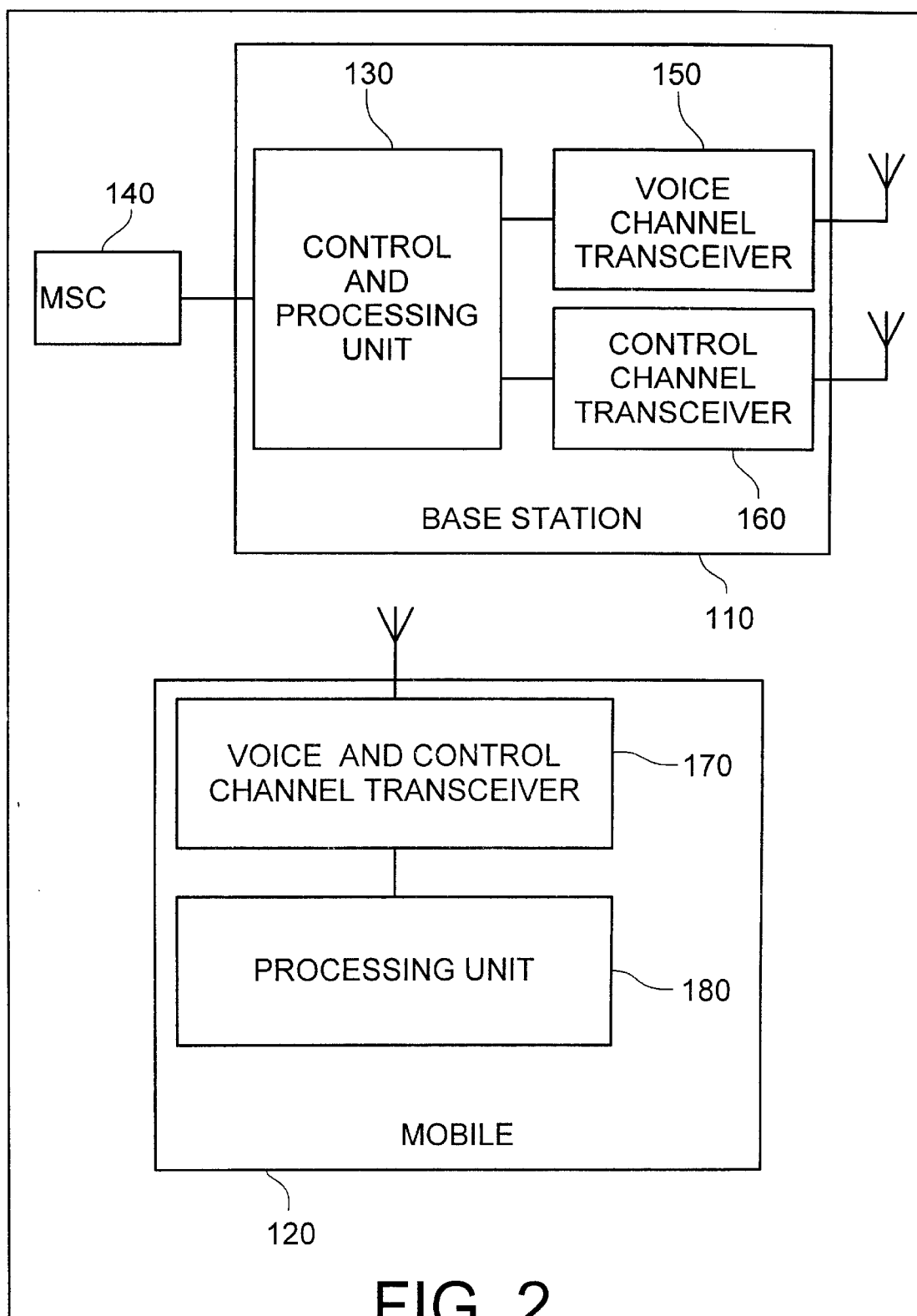
FIG. 2 is a block diagram of an exemplary cellular mobile radiotelephone system.

It will be appreciated that the functions of most of the devices illustrated in FIG. 8 can be carried out by a base station processing unit 130 (see FIG. 2). It will also be appreciated that the generators 802, 804 may be replaced by a suitable memory for storing a set or a subset of M-length S-Hadamard code words. Moreover, the generators 802, 804, 808 and the selector 806 may be replaced by a suitable memory for storing one or more sequences of selected S-Hadamard code words.

Figure 9A:
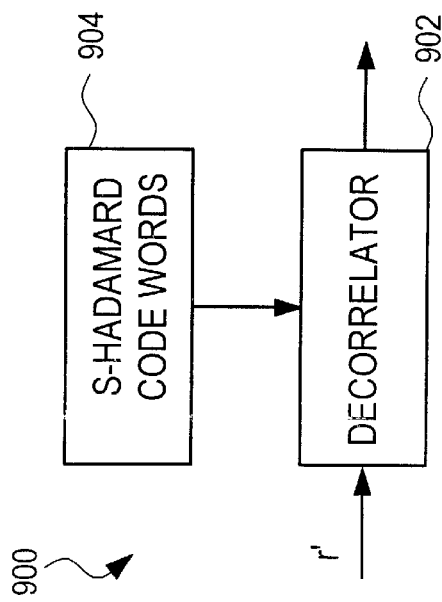

FIGS. 9A, 9B, 9C are block diagrams of parts of receivers in accordance with Applicant's invention. In the receiver 900 shown in FIG. 9A, a received complex sequence r' is provided to a decorrelator 902 that forms the correlation of the sequence r' with members of a set of S-Hadamard code words that are provided by a suitable generator 904, which as noted above in connection with FIG. 8 may simply by a memory for storing the code words. The output of the decorrelator 902 is a value or other measure suitable for a task like cell search, e.g., an indication of the identity or identities of the S-Hadamard code words in the received sequence. Although feasible, decorrelating in the manner of FIG. 9A does not take advantage of most of the efficiencies possible with S-Hadamard code words.

FIG. 9B illustrates part of a more efficient receiver 900', in which the received sequence r' is provided to a multiplier 910 that forms the product of the sequence r' and a special sequence S provided by a suitable generator 912. The "descrambled" sequence r produced by the multiplier 910 is provided to a decorrelator 914 that correlates the sequence r with members of a set or subset of M-length Walsh-Hadamard sequences as described above. The Walsh-Hadamard sequences are provided by a suitable generator 916, which may be a processor for recursively generating the sequences or a memory for simply retrieving them. It will be appreciated that the decorrelator 914 and the generator 916 may be advantageously replaced by a FWT processor. As in FIG. 9A, the output of the decorrelator/FWT is a value or other measure suitable for a task like cell search, e.g., an indication of the identity or identities of the S-Hadamard code words in the received sequence.

FIG. 9C illustrates part of a receiver 900" that includes a decorrelator 920 and a decorrelator 922. In one form of receiver 900", the decorrelator 920 forms consecutive partial decorrelations of the received sequence r' with a plurality of short sequences that have lengths less than M and that correspond to position-wise multiplication of the special sequence S and a subsequence of a member of the set of M-length Walsh-Hadamard sequences. The results of that decorrelation process are provided to the other decorrelator 922 that correlates the consecutive partial decorrelations with members of a set of Walsh-Hadamard sequences that includes the subsequence. As above, the decorrelator 922 can be replaced by an FWT, and the output is a value or other measure suitable for a task like cell search, e.g., an indication of the identity or identities of the S-Hadamard code words in the received sequence.

In another form of the receiver 900", the decorrelator 920 forms partial consecutive decorrelations of the "descrambled" received sequence r with a subsequence of the M-length Walsh-Hadamard sequences. A multiplier for forming the product (sequence r) of the received sequence r' and the special sequence S is omitted from FIG. 9C for clarity. The results produced by the decorrelator 920 are then correlated by the decorrelator 922 with members of a set of Walsh-Hadamard sequences that includes the subsequence. As above, the decorrelators 920, 922 can be replaced by FWTs, etc.

It will be appreciated that Applicant's invention is useful in a communication system such as the WCDMA system described by ARIB, which employs masked symbols, in addition to a communication system such as the WCDMA system described by ETSI, which employs PSC and SSCs in a synchronization channel SCH. (A "masked symbol" is a symbol that is not scrambled, viz., a base station's scrambling code is "masked", or blocked, for that symbol.) As noted above, the PSC and SSCs are added to a downlink (base station to remote terminal) signal after the other components of the downlink signal, e.g., traffic information for various remote terminals, has been combined and scrambled. The masked symbols in ARIB's currently proposed WCDMA system generally correspond to the PSC and SSCs in ETSI's system, but the masked symbols are time-multiplexed with the components of the downlink signal. For example, masked symbols may be embedded from time to time in a traffic channel.

As yet another example, let each row in a matrix $H_k$ constitute a length $M=2^k$ Walsh-Hadamard sequence of +1/−1 entries. If only a subset of the M Walsh-Hadamard sequences is to be transmitted, e.g., N sequences, an FWT receiver calculates M−N unnecessary correlation values as noted above. If the N sequences are chosen well, however, the receiver can perform a smaller order FWT and reduce the complexity significantly. In particular, assume N is an integer power of 2 and let L=M/N. Then, let the N sequences be chosen as every L-th row of $H_k$ starting from, say, row j. Close inspection of these N sequences reveals that each sequence comprises N signed copies of a length-L subsequence S', which is the same for all N chosen sequences. The signed copies of S' in a matrix form a Sylvester-type Walsh-Hadamard matrix of order N.

As a numerical example, assume M=16, N=4, L=16/4=4, and j=2. Then, the N=4 sequences chosen from the Walsh-Hadamard matrix $H_4$ are as follows:

row 2=[1, −1, 1, −1, 1, −1, 1, −1, 1, −1, 1, −1, 1, −1, 1, −1]

row 6=[1, −1, 1, −1, −1, 1, −1, 1, 1, −1, 1, −1, −1, 1, −1, 1]

row 10=[1, −1, 1, −1, 1, −1, 1, −1, −1, 1, −1, 1, −1, 1, −1, 1]

row 14=[1, −1, 1, −1, −1, 1, −1, 1, −1, 1, −1, 1, 1, −1, 1, −1]

or row 2=[+S', +S', +S', +S']

row 6=[+S', −S', +S', −S']

row 10=[+S', +S', −S', −S']

row 14=[+S', −S', −S', +S']

where the subsequence S'=[1, −1, 1, −1]. The corresponding sign matrix is given by:

$$\begin{pmatrix} 1 & 1 & 1 & 1 \\ 1 & -1 & 1 & -1 \\ 1 & 1 & -1 & -1 \\ 1 & -1 & -1 & 1 \end{pmatrix}$$

It can be noted that the sign matrix is a Sylvester-type Walsh-Hadamard matrix of order 4, i.e., $H_2$.

The above structure suggests that the receiver should first perform N correlations of the subsequence S' with the N consecutive length-L subsegments of the received sequence and then perform an N-point FWT.

Thus, with a complexity of only $N \cdot L + N \cdot \log_2 N$ complex additions, all the N correlation values can be obtained. This is to be compared with the N·M operations needed if ordinary correlations have to be used, which is the case for a general set of sequences.

Unfortunately, these Walsh-Hadamard sequences have poor auto- and cross-correlation properties. Nevertheless, these sequences can be suitably modified as explained above, giving a code family having good auto- and cross-correlation properties and low detector complexity.

The new sequences are obtained by "scrambling" (viz., position-wise changing the sign of) Walsh-Hadamard sequences with a fixed length-M special sequence S. The resulting set of sequences keep the orthogonality property of the Walsh-Hadamard sequences regardless of the choice of S as long as the elements all have unit magnitude. Also, a receiver can utilize the FWT structure by first "descrambling" the received sequences by multiplying with S and then performing an FWT (see, e.g., FIG. 9B).

Thus, the code can be constructed in a transmitter by choosing N rows of the Walsh-Hadamard matrix as above to get the basic Walsh-Hadamard sequences; and scrambling each chosen sequence with the special sequence S. The resulting sequences comprise a set of orthogonal codes that can be used, for example, in the synchronization channel SCH.

The receiver can descramble the received sequence by multiplying by the special sequence S; perform N correlations of length-L consecutive subsegments of the descrambled sequence with the subsequence S'; and perform an N-point FWT to get the final result. The number of operations required is thus about $M + N \cdot L + N \cdot \log_2 N$ complex additions. Furthermore, observing that the first two steps in the receiver can be combined, only $N \cdot L + N \cdot \log_2 N$ complex additions are needed.

As a numerical example corresponding to using seventeen orthogonal Gold codes, assume N=32, while well aware that Applicant's method then will deliver fifteen values that will not be used. Choose every eighth Walsh-Hadamard sequence of the order-256 Walsh-Hadamard matrix $H_8$. With Applicant's method, 256+256+32·5=672 complex additions are needed; for a general set of sequences without the Fast Walsh Transform structure, 17·256=4352 complex additions would be needed. If the receiver's first two steps are combined, only 256+32·5=416 operations are needed—a saving of more than a factor of ten. Thus, for a complexity less than two length-256 correlations, all seventeen correlation values (and fifteen unused ones) are obtained.

As noted above, there is no need to explicitly generate or store the sequences with which to correlate at the receiver (except for S and S') since the code structure is embedded in the FWT procedure. For a general set of sequences or for a receiver that does not use an FWT, the extra complexity/memory requirement for generating/storing the N sequences before the actual correlations also has to be taken into account.

Methods 1 and 2 are described above in a context in which entire S-Hadamard sequences are used, e.g., each PSC and/or SSC is a complete S-Hadamard sequence. It will be understood that this is not necessary. Indeed, it may be advantageous to split a high-order S-Hadamard sequence into pieces, transmit the pieces in the manner of the integral sequences described above, e.g., with time intervals between the pieces, and then associate the received pieces into the complete S-Hadamard sequence for processing.

For example, a communication system having frames that each have sixteen SSC positions of 256 bits or chips could use a sixteen-element sequence of length-256 S-Hadamard sequences (which may or may not be mutually distinct and/or modulated) as above or the system could use sixteen pieces of a length-(16·256) S-Hadamard sequence. The higher-order S-Hadamard sequence in this example has a length of 4096 (i.e., $2^{12}$) bits or chips, and such a high-order sequence can be used directly for various purposes, e.g., to represent the identity of a BS scrambling code group.

Figure 10:
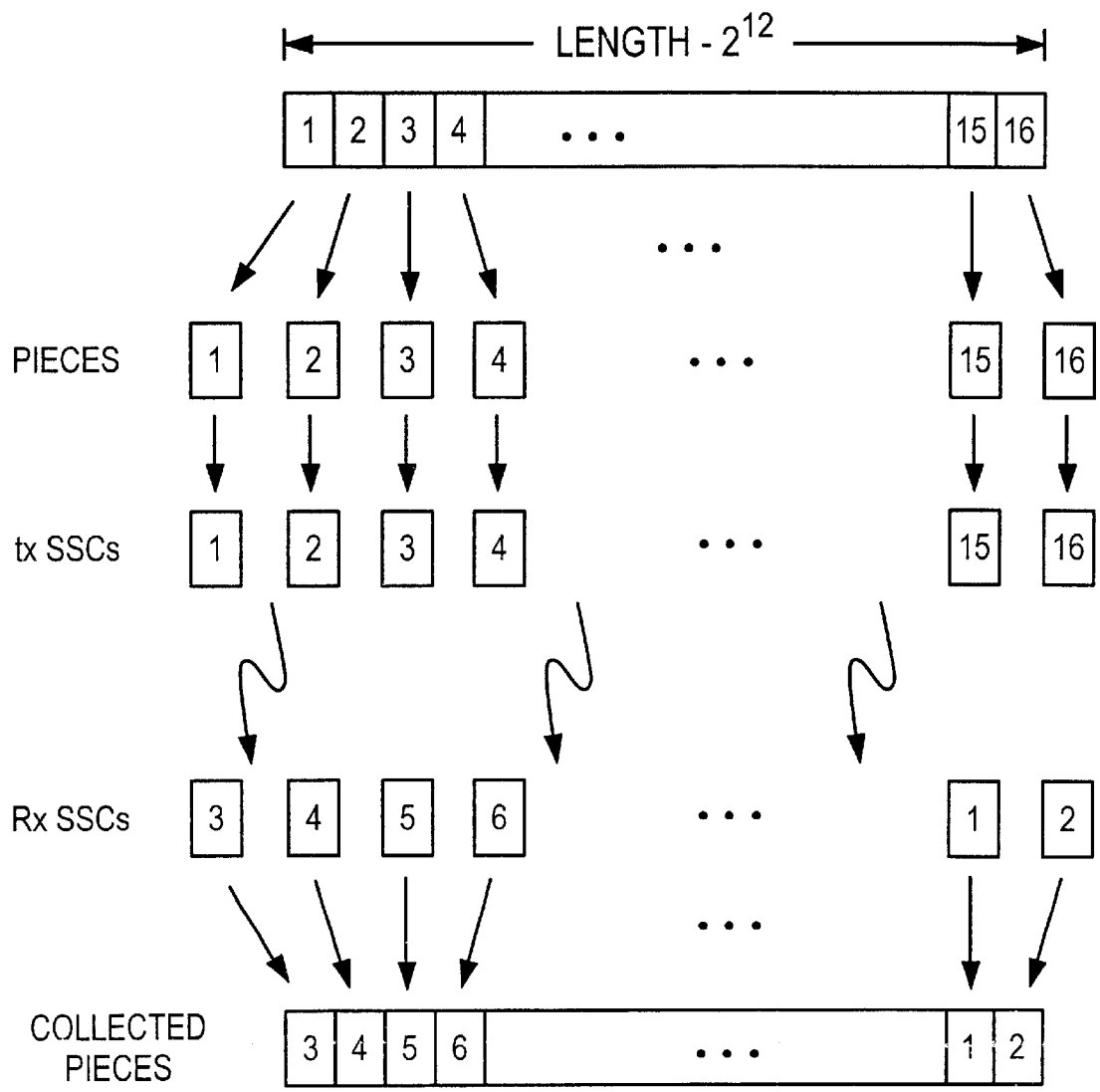
FIG. 10 illustrates the use of high-order S-Hadamard sequences.

A WCDMA transmitter, then, could discontinuously transmit the pieces of the high-order S-Hadamard sequence as (possibly non-orthogonal) SSC symbols. This is illustrated by FIG. 10, which shows a length-$2^{12}$ S-Hadamard sequence split into sixteen length-$2^8$ pieces 1, 2, . . . , 16 that are embedded in a transmitted signal as SSCs with intervening time intervals. (Although the time intervals between SSCs are identical, it will be appreciated that this is not necessary in general.) As noted above, the transmitter can be configured substantially as illustrated by FIG. 8.

All that is necessary to obtain the benefits of S-Hadamard sequences described above is for the receiver to "know" or to be able to determine in some way the locations of the pieces in its received signal. In the proposed WCDMA communication systems, the locations of the pieces would be "known" if the pieces were transmitted as the SSCs or as some other known data element of a slot. A receiver that has established slot synchronization but not frame synchronization can determine the pieces of the high-order S-Hadamard sequence but not the initial piece, which is illustrated in FIG. 10 by the sequence of pieces 3, 4, . . . , 16, 1, 2.

The receiver collects the pieces and identifies the received S-Hadamard sequence in a manner as described above, e.g., by first "descrambling" the collected pieces by multiplying them by all of the appropriate cyclic shifts of the special sequence used to form the high-order S-Hadamard sequence (see step 702 in FIG. 7). As one example, the special sequence can be a length-$2^{12}$ orthogonal gold code. Then, the receiver correlates, either by brute force or FWT, the collected pieces in the order indicated by the descrambling against the members of the set of high-order S-Hadamard sequences to identify the member received (see step 704 in FIG. 7). As noted above, the receiver can be configured as any of FIGS. 9A, 9B, 9C.

Using higher-order sequences has a number of potential advantages, among which is the greater ease of finding sequences having "good" properties. It will also be recognized that rather than using sixteen pieces of one length- 4096 S-Hadamard sequence, the system could use eight pieces of each of two length-2048 S-Hadamard sequences or four pieces of each of four length-1024 S-Hadamard sequences, etc. In addition, it will be understood that the receiver can begin the processes of descrambling and identifying the high-order S-Hadamard sequence as the pieces are received by using pieces of the special sequence and pieces of the members of the set of high-order S-Hadamard sequences. Since the high-order sequence may be long; it can be advantageous for it not to be not necessary to wait until all pieces have been received.

A communication system or receiver in accordance with Applicant's invention enjoys many advantages. One can select the periodic or aperiodic, auto- or cross-correlation properties of at least one sequence by suitably choosing the special sequence S. Slot synchronization in a WCDMA-like communication system is facilitated because a sequence can be selected that performs better than a Gold code PSC due to a suitable choice of the special sequence S. An efficient Fast Walsh Transform can be used by the receiver. A smaller sized Fast Walsh Transform can be used by the receiver when the number of used sequences is a suitably chosen subset of all possible sequences. Such efficient receiver implementations are suited for battery-powered devices.

It will be appreciated by those of ordinary skill in the art that this invention can be embodied in other specific forms without departing from its essential character. The embodiments described above should therefore be considered in all respects to be illustrative and not restrictive.

What is claimed is:

1. A method of determining a scrambling code group for a received signal in a digital communication system, in which signals are scrambled by respective scrambling codes, the scrambling codes are assigned to respective scrambling code groups, identities of the scrambling code groups are encoded in the signals by respective code-word-wise cyclically distinct sequences of signed code words, the method comprising the steps of:

correlating the received signal to each of a plurality of the code words, wherein the code words are S-Hadamard sequences;

coherently combining the correlations in accordance with cyclic shifts of each of a plurality of sequences of signs; and determining a maximal coherently combined correlation to identify the scrambling code group for the received signal.

2. The method of claim 1, wherein each sequence of signed code words corresponds to a frame of the received signal, and determining the maximal coherently combined correlation identifies a start of the frame.

3. A method of determining a scrambling code group for a received signal in a digital communication system, in which signals are scrambled by respective scrambling codes, the scrambling codes are assigned to respective scrambling code groups, identities of the scrambling code groups are encoded in the signals by respective code-word-wise cyclically distinct sequences of code words, the method comprising the steps of:

correlating the received signal to cyclic shifts of each of a plurality of sequences of code words, wherein the code words are S-Hadamard sequences;

combining the correlations for each of the plurality of sequences of code words; and determining a maximal combined correlation to identify the scrambling code group for the received signal.

4. The method of claim 3, wherein each sequence of code words corresponds to a frame of the received signal, and determining the maximal combined correlation identifies a start of the frame.

5. The method of claim 3, wherein the correlations are coherently combined.

6. The method of claim 3, wherein the correlations are non-coherently combined.

7. A digital radio transmission system having at least one transmitter and at least one receiver, comprising:

means in the transmitter for generating a synchronization signal that includes signed versions of S-Hadamard sequences, wherein the S-Hadamard sequences correspond to members of a first set of Walsh-Hadamard sequences position-wise scrambled with a special sequence having complex elements of constant magnitude;

means in the receiver for estimating a time location and sequence identity of a received version of the synchronization signal.

8. The system of claim 7, wherein the estimating means descrambles the received version based on the special sequence and correlates the descrambled received version to members of the first set of Walsh-Hadamard sequences for identifying the sequence identity.

9. The system of claim 8, wherein the estimating means correlates using a Fast Walsh Transform.

10. The system of claim 7, wherein the estimating means correlates the received version to the S-Hadamard sequences for identifying the sequence identity.

11. The system of claim 7, wherein the estimating means descrambles the received version based on the special sequence, forms consecutive partial decorrelations of the descrambled received version with a subsequence of a member of the first set of Walsh-Hadamard sequences, and correlates the consecutive partial decorrelations to members of a second set of Walsh-Hadamard sequences, and the members of the second set have lengths less than lengths of the members of the first set.

12. The system of claim 11, wherein the estimating means correlates the consecutive partial decorrelations to members of the second set using a Fast Walsh Transform.

13. The system of claim 7, wherein the estimating means forms consecutive partial decorrelations of the received version with a plurality of short sequences and correlates the consecutive partial decorrelations with members of a second set of Walsh-Hadamard sequences, and the short sequences and the members of the second set have lengths less than lengths of the members of the first set, and the short sequences correspond to position-wise multiplication of the special sequence and a subsequence of a member of the first set.

14. The system of claim 13, wherein the estimating means correlates the consecutive partial decorrelations with members of the second set using a Fast Walsh Transform.

15. The system of claim 7, wherein the special sequence is an orthogonal Gold code sequence.

16. The system of claim 7, wherein the special sequence is one of a pair of complementary code word sequences.

17. A method of determining a time location of a received signal and identifying a Walsh-Hadamard sequence encoded as a S-Hadamard sequence included in the received signal, wherein the S-Hadamard sequence is a product of the Walsh-Hadamard sequence and a special sequence having complex elements of constant magnitude and the Walsh-Hadamard sequence is a member of a first set of Walsh-Hadamard sequences, comprising the steps of:

forming a position-wise product of the received signal and the special sequence; and correlating the product with each of a plurality of Walsh-Hadamard sequences for identifying the Walsh-Hadamard sequence encoded in the received signal.

18. The method of claim 17, wherein the position-wise product is correlated with members of the first set based on a Fast Walsh Transform.

19. The method of claim 17, wherein the position-wise product is correlated by forming consecutive partial decorrelations of the position-wise product with a subsequence of a member of the first set of Walsh-Hadamard sequences and correlating the consecutive partial decorrelations to members of a second set of Walsh-Hadamard sequences, and the members of the second set have lengths less than lengths of the members of the first set.

20. The method of claim 19, wherein the consecutive partial decorrelations are correlated to members of the second set using a Fast Walsh Transform.

21. The method of claim 17, wherein the position-wise product is correlated by forming consecutive partial decorrelations of the position-wise product with a plurality of short sequences and correlating the consecutive partial decorrelations with members of a second set of Walsh-Hadamard sequences, and the short sequences and the members of the second set have lengths less than lengths of the members of the first set, and the short sequences correspond to position-wise multiplication of the special sequence and a subsequence of a member of the first set.

22. The method of claim 21, wherein the consecutive partial decorrelations are correlated with members of the second set using a Fast Walsh Transform.

23. The method of claim 17, wherein the special sequence is an orthogonal Gold code sequence.

24. The method of claim 17, wherein the special sequence is one of a pair of complementary code word sequences.

25. A method of communicating an identity of a scrambling code group for a transmitted signal in a digital communication system, in which signals are scrambled by respective scrambling codes and the scrambling codes are assigned to respective scrambling code groups, comprising the steps of:

providing at least one S-Hadamard sequence; and encoding the identity of the scrambling code group in the transmitted signal as a code-word-wise cyclically distinct sequence of signed S-Hadamard sequences.

26. The method of claim 25, wherein the sequence of signed S-Hadamard sequences corresponds to a frame of the transmitted signal.

27. A method of communicating an identity of a scrambling code group for a transmitted signal in a digital communication system, in which signals are scrambled by respective scrambling codes and the scrambling codes are assigned to respective scrambling code groups, comprising the steps of:

providing a plurality of S-Hadamard code words; and encoding the identity of the scrambling code group in the transmitted signal as a code-word-wise cyclically distinct sequence of the S-Hadamard code words.

28. The method of claim 27, wherein the sequence of S-Hadamard code words corresponds to a frame of the transmitted signal.

29. A signal generator in a radio transmitter, comprising:

a special sequence generator that produces a special sequence having complex elements of constant magnitude;

an S-Hadamard sequence generator that receives the special sequence and that produces at least one S-Hadamard sequence based on the special sequence, wherein S-Hadamard sequences correspond to respective members of a set of Walsh-Hadamard sequences position-wise scrambled with the special sequence;

an identity generator that produces a scrambling code group identity;

a selector that selects an S-Hadamard sequence produced by the S-Hadamard sequence generator based on the scrambling code group identity;

a combiner that combines the S-Hadamard sequence selected by the selector with an information signal, forming a combined signal.

30. The signal generator of claim 29, wherein the special sequence generator includes a memory from which the special sequence is retrieved.

31. The signal generator of claim 29, wherein the S-Hadamard sequence generator includes a processor that recursively generates Walsh-Hadamard sequences and a multiplier that forms products of the special sequence and Walsh-Hadamard sequences generated by the processor.

32. The signal generator of claim 29, wherein the S-Hadamard sequence generator includes a memory in which Walsh-Hadamard sequences are stored and a multiplier that forms products of the special sequence and Walsh-Hadamard sequences retrieved from the memory.

33. The signal generator of claim 29, wherein the identity generator includes a memory from which the scrambling code group identity is retrieved.

34. An apparatus for use in determining a scrambling code group for a received signal in a digital communication system, in which signals are scrambled by respective scrambling codes, the scrambling codes are assigned to respective scrambling code groups, identities of the scrambling code groups are encoded in the signals by respective code words, the apparatus comprising:

an S-Hadamard code word generator that produces at least one S-Hadamard code word based on a special sequence, wherein S-Hadamard code words correspond to respective members of a set of Walsh-Hadamard sequences position-wise scrambled with the special sequence; and a decorrelator, wherein the decorrelator forms at least one correlation of the received signal with at least one S-Hadamard code word produced by the S-Hadamard code word generator.

35. The apparatus of claim 34, wherein the S-Hadamard code word generator includes a memory from which the at least one S-Hadamard code word is retrieved.

36. The apparatus of claim 34, wherein the decorrelator includes:

a primary decorrelator that forms consecutive correlations of the received signal with a plurality of shorter sequences that correspond to position-wise multiplications of the special sequence and a subsequence of a member of the set of Walsh-Hadamard sequences; and a secondary decorrelator that forms correlations of the consecutive correlations formed by the primary decorrelator with members of a set of Walsh-Hadamard sequences that includes the subsequence.

37. The apparatus of claim 36, wherein the secondary decorrelator is a Fast Walsh Transform processor.

38. The apparatus of claim 36, further comprising a multiplier that forms a product of the received signal and the special sequence, producing a descrambled received signal, and wherein the primary decorrelator forms consecutive correlations of the descrambled received signal with a subsequence of a member of the set of Walsh-Hadamard sequences.

39. The apparatus of claim 38, wherein the primary and secondary decorrelators are a Fast Walsh Transform processor.

40. An apparatus for use in determining a scrambling code group for a received signal in a digital communication system, in which signals are scrambled by respective scrambling codes, the scrambling codes are assigned to respective scrambling code groups, identities of the scrambling code groups are encoded in the signals by respective code words, the apparatus comprising:

a special sequence generator that produces a special sequence having complex elements of constant magnitude;

a multiplier that forms a product of the received signal and the special sequence, producing a descrambled received signal;

a Walsh-Hadamard sequence generator that produces at least one Walsh-Hadamard sequence; and a decorrelator, wherein the decorrelator forms at least one correlation of the descrambled received signal with at least one Walsh-Hadamard sequence produced by the Walsh-Hadamard sequence generator.

41. The apparatus of claim 40, wherein the special sequence generator includes a memory from which the special sequence is retrieved.

42. The apparatus of claim 40, wherein the Walsh-Hadamard sequence generator includes a processor that recursively generates Walsh-Hadamard sequences.

43. The apparatus of claim 40, wherein the Walsh-Hadamard sequence generator includes a memory from which at least one Walsh-Hadamard sequence is retrieved.

44. The apparatus of claim 40, wherein the Walsh-Hadamard sequence generator and the decorrelator are a Fast Walsh Transform processor.

* * * * *